United States Patent Office 3,379,300
Patented Apr. 23, 1968

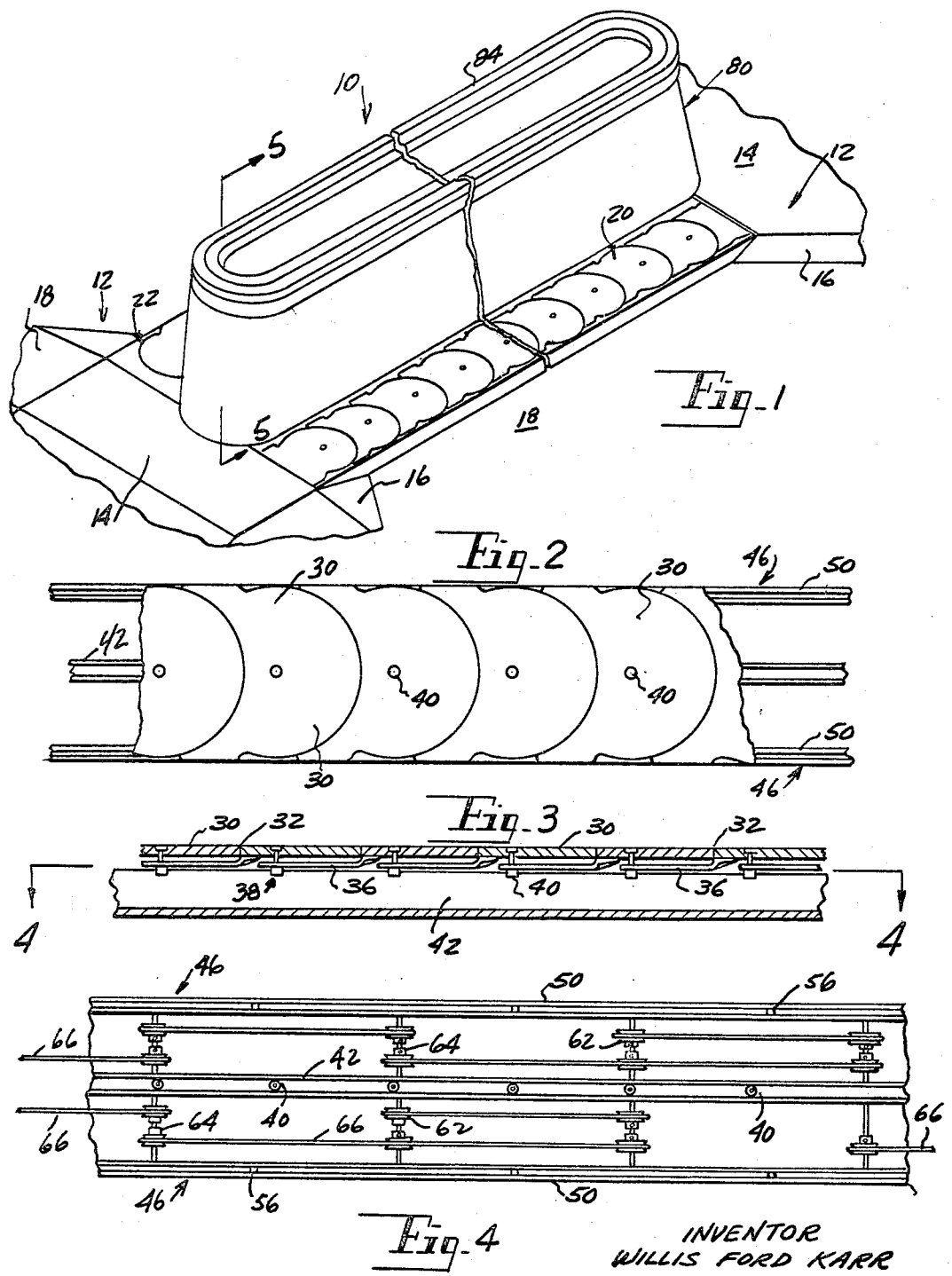

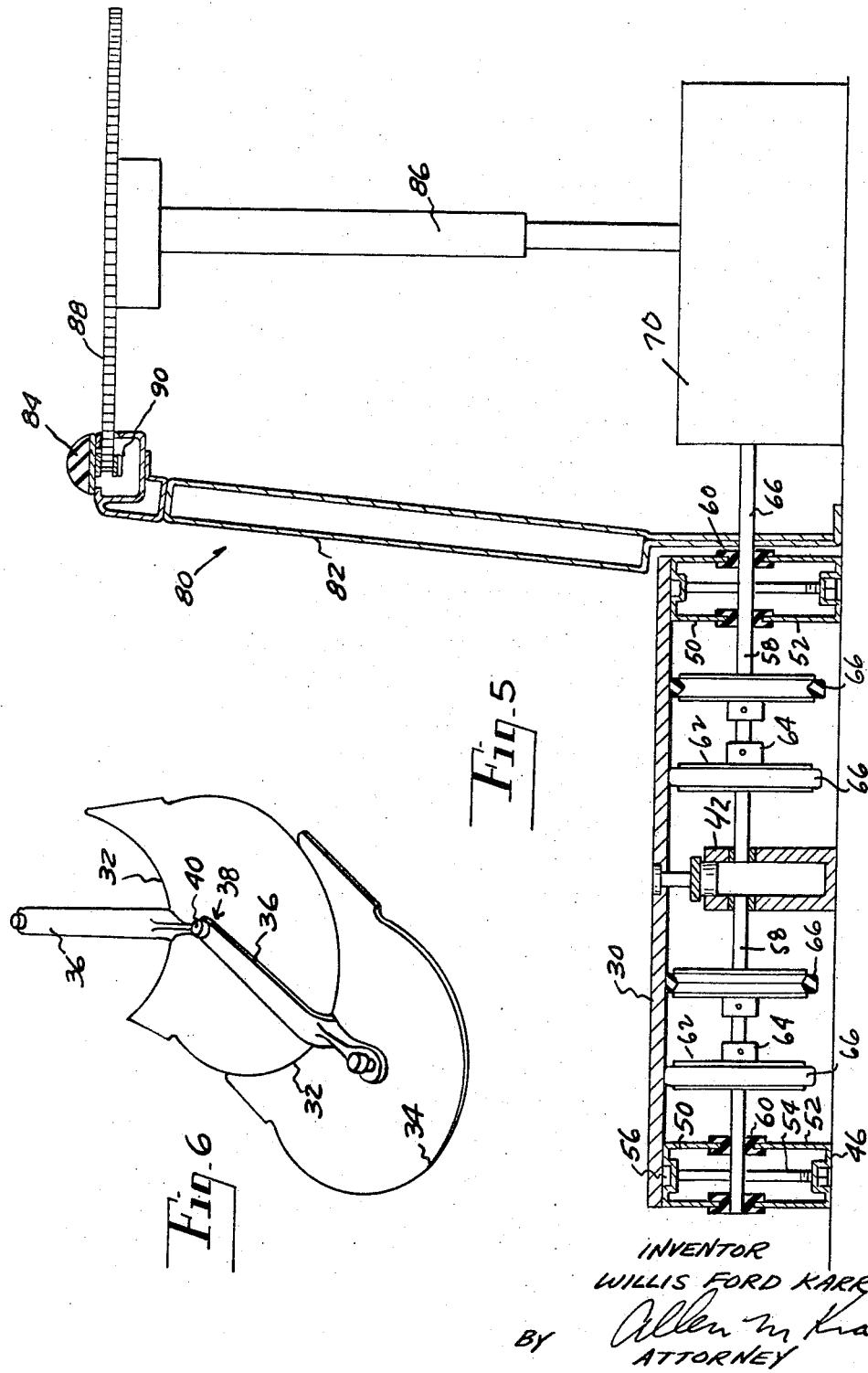

3,379,300
MOVING SIDEWALK
Willis Ford Karr, Warren, Mich., assignor to Stearns Manufacturing Company, Inc., Flat Rock, Mich, a corporation of Michigan
Continuation-in-part of applications Ser. No. 423,267, Jan. 4, 1965, and Ser. No. 461,232, June 4, 1965. This application Oct. 24, 1965, Ser. No. 504,335
3 Claims. (Cl. 198—181)

ABSTRACT OF THE DISCLOSURE

A conveyor consists of a plurality of flat pallets each having a convex edge and a concave edge, joined together by links which retain the pallets with the concave edge of one abutting the convex edge of the next. The links are fixed to one pallet and pivotably supported to the next so as to allow pivoting motion of one pallet with respect to the next, in the plane of the surfaces of the pallets, about the center of the convex edge of the abutting edges. The pallets are supported on a plurality of short, closed loop, belt sections which are arrayed about axes disposed normally to the pallet course, and to the pallet surfaces, so that one surface of the belt extends parallel to the pallet course. The belts are shorter than the pallet course, and the ends of the belts overlap one another.

---

This application is a continuation-in-part of United States patent application, Ser. No. 423,267, filed on Jan. 4, 1965 and now U.S. Patent No. 3,314,517 and United States patent application Ser. No. 461,232, filed June 4, 1965. Like those applications, it relates to powered conveyors adapted to move people or articles on various horizontal or inclined paths. My previous applications have set forth the advantages of so-called "moving sidewalks" to carry pedestrians between separated areas. Broadly, such devices allow for the efficient, comfortable and orderly transfer of large numbers of people within the confines of large public buildings. Each of the parent applications disclosed a conveyor formed of a closed loop of pallets having flat upper surfaces, such pallets being joined together by links which extend along their undersides. The pallets were retained on a closed course by means of a guide, which engaged either the pallets or the links and directed them along the conveyor course which included curves and inclines, or combinations such as spirals. My first application disclosed such conveyor elements arranged in segments formed of relatively short, closed loops with pedestrian cross-overs disposed between adjacent loops so as to form longer sections. The later application disclosed, among other things, a pallet configuration consisting of a plate having one concave side and one convex side with the meeting sides of adjacent pallets disposed together so that the pallets could traverse curves without opening up gaps between them.

The invention of the present application is an improvement on the previously disclosed moving sidewalk configurations and more particularly discloses an arrangement for supporting and driving a conveyor formed of a number of pallets having concave and convex surfaces, in a sturdy, low cost, quiet manner.

As disclosed in the following description of a preferred embodiment of my invention, a conveyor path includes a pair of elongated side rails which are disposed parallel to and separated from each other and which define the side limits of the conveyor path. The side rails may curve and incline in any reasonable arrangement. A pallet guide section extends along the length of the conveyor path equidistantly between the side rails. A plurality of rotatable shafts are supported between each of the outer sides of the center guide and transversely opposite points on the interiors of the outer rails. These shafts thus extend transversely to the conveyor path and are disposed in a horizontal orientation. The shafts are rotatably journaled at both the center guide and the side rails in bearings mounted in rubber grommets that act to insulate vibration between the rails and the shafts. These grommets support the shaft bearing in a floating fashion. The transverse shafts are arranged at regular, relatively short intervals. Each has at least two pulleys fixed to it and closed loop V belts are arrayed over the pulleys. The belts may pass around a pair of end pulleys and just lie over one or more intermediate pulleys. The pulleys over which a particular belt is arrayed will have the same spacing from the center guide so that the length of the belt extends parallel to the conveyor path. The belts are preferably arranged to overlap one another so that two or more belts extend between the sides of the center guide and the side rails at any point.

In the preferred embodiment of the invention, the pallets which consist of flat plates having one concave edge and an opposing convex edge lay directly over the belts. The pallets are joined together by links which have one end fixed to a pallet at the center of its convex surface and the other end pivotally attached to the same point on an adjacent pallet. The concave and convex surfaces allow the pallets to rotate with respect to one another when traversing curves. A point on the link directly below the center of each pallet is journaled in the central guide. The links array along the guide in directions tangential to the conveyor path and maintain the pallets in the proper orientation as they traverse the path.

The drive for the conveyor simply consists of a motor rotatably connected to one or more of the shafts so as to drive the belts. The friction between the upper sides of the belts and the under sides of the pallets moves the pallets along the conveyor and the motion is transferred to all of the conveyors in the chain both through tension and compression of the chain.

The belt drive and support for the pallets provide a resilient noise-free system that is relatively low in cost and is self cleaning. It moves the pallets smoothly and allows motion along curves or inclines.

Another aspect of the present invention resides in the nature of the connection between the pallet links and the pallets which allows the pallets to traverse inclines while maintaining the pallet surfaces in a horizontal position. This requires that the links, which must assume the angle of the incline, be connected to both the forward and rearward pallets by pivotable links. The connection between a link and the pallet to which it is affixed in the horizontal plane consists of a trunnion mount that allows the pallet to be inclined with respect to the link but still transfers the rotational motion of the link in the horizontal plane to the pallet.

It is therefore seen to be a primary object of the present invention to provide a conveyor of the pallet type wherein the pallets are supported and driven by belts which extend in short segments parallel to the conveyor path and which are journaled on pulleys that rotate about axes lateral to the conveyor extensions.

Another object is to provide such arrangement wherein the pulleys are journaled on shafts which have a floating connection with the conveyor frame.

Other objects, advantages and applications of the present invention will be made apparent by the following detailed description of a preferred embodiment of the invention. The description makes reference to the accompanying drawings in which:

FIGURE 1 is a perspective view of a closed conveyor section broken away in the center for purposes of illustration;

FIGURE 2 is a plan view of the top of one of the pallet courses;

FIGURE 3 is a side view of one of the pallet courses;

FIGURE 4 is a plan view of a straight conveyor section with the pallets removed;

FIGURE 5 is a transverse section taken through the end of the conveyor section taken along line 5—5 of FIGURE 1;

Figure 7:
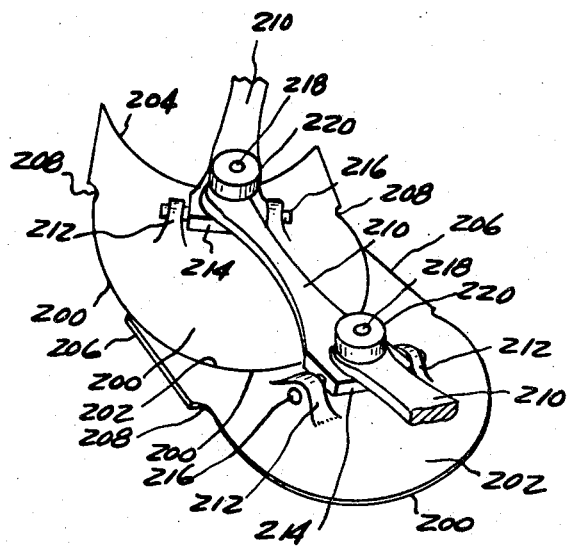

FIGURE 6 is a perspective view of the underside of a pair of pallets employed in the conveyor of FIGURE 1; and FIGURE 7 is a perspective view of the underside of a pair of pallets and a linking member representing a second embodiment of the invention adapted to traverse inclines, showing the manner in which one pallet may be elevated with respect to an adjacent pallet as is required in traversing inclines.

Referring to the drawings, FIGURE 1 pictorially illustrates one complete, closed loop section of a first embodiment of the moving sidewalk, generally indicated at 10. The length of a particular section is not important to the present invention. Unit 10 comprises: a pair of straight line paths moving in opposite directions with curved end returns. It should be understood that this is but one configuration which the conveyor may take. In addition to traversing straight line paths, it may also be arranged in inclined or spiral configurations of a wide variety.

The unit 10 shown in FIGURE 1 includes a pair of straight line paths, each of which terminate in a stationary platform, generally indicated at 12. Each platform consists of a horizontal section 14 joined by a plurality of inclined sections 16 to an existing grade level 18. A plurality of conveyor sections 10 may be joined together with stationary platforms 12 serving as terminals and to connect the conveyor sections so that pedestrians may cross the general line of travel of the conveyor at the stationary platforms.

The section 10 connects the two end platforms 12 with a first conveyor section, generally indicated at 20 which moves in the first direction and a second conveyor section, generally indicated at 22 which moves in the opposite direction. The two sections are parts of the same closed loop conveyor line formed of a plurality of pallets 30, which are exposed in the straight-away sections 20 and 22 and move under the platforms 12 and semicircular return paths at the end sections.

Each pallet 30 consists of a flat plate having a pair of parallel sides 31 joined at one end by a semicircular concave surface 32 and at the other end by a semicircular convex surface 34. The pallets 30 are connected to one another by links 36 which have one end fixed to one pallet and their other end pivotably connected to the next pallet on the side of the concave curve 32 by means of a joint 38 which is pivotable in the plane of the pallet about the center of the convex curve 34. These links 36 tie the pallets into a continuous chain.

The joints 38 support on their lower end follower members 40 which each consists of a roller supported for rotation about a vertical axis aligned with the center of the concave curve 34. These rollers 40 are set in guides formed of a pair of center rails 42 (best seen in FIGURE 4) which extend along the center of the conveyor course. A pair of side rails 46 spaced equidistantly on opposite sides of the center rails 42. As is seen in FIGURE 5 the side rails 46 are box-shaped in cross-section and are formed of upper and lower channel shape members 50 and 52 disposed with their channels in opposition to one another and retained together by bolt members 54 which pass through the webs of each member and fixed by nuts 56. The bolts are disposed at regular intervals along the channel members 50 and 52, which are curved in the nonlinear sections of the conveyor to conform to the conveyor course.

At regular intervals, intermediate the bolts 54, the side rails support fixed shafts 58 which extend between the inner sides of each of the side rails and the outer sides of the center rails 42 and are aligned transversely to the conveyors path as defined by the side rails. They are retained in both the outer rails and center rails by rubber grommet-like rings 60. At the side rails, the rings 60 are disposed in both the inner and outer side walls of the channels and the shafts 58 pass through the center of the channel and have their ends retained in a ring disposed in the outer side wall as well as one in the inner side wall to provide additional support to the shaft. As the shafts 58 always extend transversely to the course of the conveyor during the curves, the ends of adjacent shafts will be more closely spaced to one another at the inside of the curves than will be their opposite ends.

The shafts 58 each rotatably support a pair of pulleys 62 which are journaled on ball bearings 64. The pulleys have an outer configuration suitable for retaining V-belts 66 which are arrayed over two or more of the pulleys 62. When they are arrayed over more than two pulleys, the pulleys between the two end pulleys just support the belts on their upper edges and the belt is wrapped about the end pulleys.

The undersides of the pallets 30 are supported by resting on the belts 66. The belts are overlapped so that a pallet surface is always supported by at least one and preferably a plurality of belts on each side of the center guides 42. The belts provide a firm yet flexible foundation for the pallets and provide non-metallic, vibration insulating contacts between the pallets and the supporting mechanism. The rings 60 provide a similar vibration insulating contact between the shafts 58 and the inner and outer rails so that the pallets are supported in a "floating manner" and a smooth, vibration-free ride is provided for passengers on the pallets.

The belts 42 power the pallets 30 along their course as well as providing support. At least one drive unit 70 is provided for a belt section. Depending upon the length of the belt a number of these drive units 50 may be provided. Preferably at least one drive unit is provided for shafts on each side of the center rail 42, although in short sections a single drive unit may be utilized. The drive unit is preferably powered by electric motors and simply provides output shafts 72 drivingly connected to a number of the shafts 58 so as to rotate the shafts and the belts 66 supported on the shafts. The frictional contact between the pallets and the belts causes this motion to be transmitted to the pallets and acts to drive the pallet chain along its course.

The guide roller 40 of each pallet is retained in the center guides 42, which follow the course and curve in such places as the course curves. Thus, the center of the convex curve of each pallet is retained on the center line of the course. The links 36 array themselves between these points on the course and therefore align tangentially to the conveyor course at any point. Since the links are each fixed to one pallet, they align that pallet along the tangent to the course and therefore provide a smooth, even pallet surface along the entire course.

The conveyor course may be provided with a center section, generally indicated at 80 which provides upwardly inclined sidewalls 82 and a hand rail 84 at the top of the inclined wall which moves in synchronism with the pallets 30. The handrail 84 may be driven by a power unit 70 through a vertical shaft 86 and a bull gear 88 arranged at the circular return of the conveyor, which contacts a chain 90 affixed to the lower end of the handrail 84.

In systems where the pallets must traverse inclines while retaining the pallet surfaces in a horizontal position, it is necessary to provide a joint, pivotable in the vertical plane (about a horizontal axis) between each of the ends of the links 36 and their joints with the pallets. As has been disclosed in the parent applications, these joints must be formed at points sufficiently below each of the pallet surfaces so that the links may swing transversely to the pallet surfaces while traversing the incline. Also the joint between a link and the pallet to which it is normally fixed must not allow motion in the plane of the pallet so that the link will properly align the pallet to the conveyor course.

The bottom view of a modification of the pallets, embodying the structure necessary to traverse inclines, is shown in FIGURE 7. The pallets 200 each have a convex surface 202 and a concave surface 204 joined by generally straight sides 206. The straight sides are notched as at 208 to limit the angle which one pallet may assume with respect to the next. The pallets are joined together by links 210. Each link 210 is mounted by a pair of trunnions 212 to the pallet on the concave side of the joint. The link has a pair of flats 214 which bear against the interior opposed sides of the trunnions 212 so as to limit the motion of the link 210 to a pivoting about an axis parallel to and slightly separated from the surface of the pallets as represented by the pin 216. At its junction to the pallet on the convex side of the joint the link 210 is pivotably joined to a flat on the upper side of the next link by a pin 218 which extends transversely to the plane of the pallet, and rollers 220 are supported on the pins 218 immediately below the undermost link surface.

This joint allows the links to pivot with respect to both of the pallets to which they are connected about an axis parallel to the pallets, but limits the motion of the link, at the trunnion mount end, to that pivoting motion, preventing a pivoting motion about an axis perpendicular to the pallets, and thereby transfers the motion of the links in the plane of the pallets to the pallets and maintains the pallets arrayed along tangents to the conveyor course.

It is thus seen that the present invention provides a conveyor arrangement which is simple, reliable, and may be easily installed over an existing course at a low cost.

Having thus described my invention, I claim:

1. A conveyor of the type described, comprising: a plurality of pallets, each having one convex surface and a concave surface on the opposed side; a plurality of links joining the pallets into a continuous chain with the convex side of one pallet abutting the concave side of an adjacent pallet, said links being attached to oe pallet by a joint which prevents motion between the pallet and the link in the plane of the surface of the pallet and the links being secured to the next pallet at the center of the convex curve of said pallet by a joint which allows motion between the link and the pallet in the plane of the pallet; a guide defining the course of the center of the pallets; means for restraining the center of the convex surface of each of the pallets to the center of the course consisting of a guide member attached to the pallet at the center of the convex curve of the pallet and movable in the center guide; a plurality of elongated, closed loop belts disposed below the pallets and arrayed about pairs of axes which extend transversely to the pallet course, and parallel to the pallet surfaces, so that the belts extend parallel to the pallet course, the upper surfaces of the belts abutting the under surfaces of the pallets so as to support the pallets; means rotating at least some the belts supporting the pallets to move the pallets along the course.

2. The conveyor of claim 1 in which said rotating means includes a plurality of shafts and wherein the ends of the shafts are supported in rails aligned tangentially to the conveyor course and flexible insulating means are disposed between the rails and the shafts.

3. The conveyor system of claim 1 and including pulleys fixed to said shafts and belts arrayed about the pulleys so as to extend longitudinally to the conveyor course and wherein at least certain of the belts are arrayed over more than two pulleys with only the upper edges of the belts riding the pulleys intermediate the end ones, and the belts are arrayed about the end pulleys so that the intermediate pulleys act as idlers and supports for the belt.

References Cited

UNITED STATES PATENTS

| 1,023,443 | 4/1912 | Seeberger | 198—18 |
| 1,191,434 | 7/1916 | Keith | 198—181 |
| 2,627,339 | 2/1953 | Whiting | 198—181 |
| 2,863,555 | 12/1958 | Jaritz | 198—191 X |
| 2,936,873 | 5/1960 | Seidman | 104—25 X |

FOREIGN PATENTS

| 749,783 | 5/1933 | France. |
| 288,954 | 4/1928 | Great Britain. |

EDWARD A. SROKA, *Primary Examiner.*

EVON C. BLUNK, *Examiner.*

R. J. HICKEY, *Assistant Examiner.*